United States Patent

[11] 3,590,613

| [72] | Inventors | Dan R. Kimberlin<br>Saginaw;<br>Floyd A. Schluckebier, Frankenmuth;<br>Henry N. Fjerstad, Jr., Saginaw; Frederick<br>C. Riffelmacher, Saginaw, all of, Mich. |
|---|---|---|
| [21] | Appl. No. | 879,866 |
| [22] | Filed | Nov. 25, 1969 |
| [45] | Patented | July 6, 1971 |
| [73] | Assignee | General Motors Corporation<br>Detroit, Mich. |

[54] COINCIDENTAL VEHICLE STEERING COLUMN AND FLOOR SHIFT LOCK
4 Claims, 6 Drawing Figs.

[52] U.S. Cl. .................................................. 70/239, 70/248
[51] Int. Cl. ...................................................... B60r 25/02, B60r 25/06, E05b 65/12
[50] Field of Search ............................................ 70/238, 239, 247, 248, 252

[56] References Cited
UNITED STATES PATENTS

| 2,147,613 | 2/1939 | Sandberg...................... | 70/239 |
| 3,490,255 | 1/1970 | Wight et al. .................. | 70/252 |

FOREIGN PATENTS

| 85,976 | 3/1936 | Sweden ....................... | 70/239 |

Primary Examiner—Albert G. Craig, Jr.
Attorneys—W. E. Finken and D. L. Ellis

ABSTRACT: Coincidental locking apparatus for an automotive vehicle steering column and a floor mounted transmission gear shift selector includes a manually operable steering column lock device operative to prevent rotation of the vehicle steering shaft, a device within the floor shift operative to latch the selector member thereof in a predetermined condition of the transmission such as "Park," and a flexible cable interconnection between the two locking devices operative to prevent locking of the steering shaft until "Park" is selected in the floor shift and further operative to hold or lock said floor shift latched in such selected condition upon manual locking of the steering column lock device.

INVENTORS.
Dan R. Kimberlin,
Floyd A. Schluckebier,
Henry N. Fjerstad, Jr. &
Frederick C. Riffelmacher
BY
D. L. Ellis
ATTORNEY INVENTORS.
Dan R. Kimberlin,
Floyd A. Schluckebier,
BY Henry N. Fjerstad, Jr. &
Frederick C. Riffelmacher O. L. Ellis
ATTORNEY

COINCIDENTAL VEHICLE STEERING COLUMN AND FLOOR SHIFT LOCK This invention relates to coincidental lock systems for the controls of automotive vehicles and more particularly to improved coincidental lock systems for automotive vehicle steering columns, ignition controls and floor mounted transmission gear shift selectors.

A general feature of this invention is that it provides an improved coincidental lock system for automotive vehicle steering column assemblies and for floor mounted transmission gear shift selector assemblies mounted in spaced relation to the steering column within the vehicle passenger compartment, the system including distinct locking devices within the column and the spaced floor shift which may be locked simultaneously and which are further interrelated so that such simultaneous locking requires the preliminary operation of selecting a predetermined operating range of the vehicle power transmission in the floor shift.

Another feature of this invention resides in the interconnection of such locking devices through the mechanically simple but effective means of a flexible cable or the like and in the arrangement of the lock device of the floor shift such that mere movement of its selector to the aforementioned predetermined position causes latching engagement of the lock device therein and further transfers movement through the interconnecting means to the steering column lock so as to negate operation of blocking apparatus in the steering column lock normally preventing movement of the steering column lock device from unlocked to locked condition.

Yet a further feature of the invention resides in the arrangement of the blocking apparatus in the steering column lock to operate in concert with the interconnecting means such that once the steering column lock is actuated to its locking position, the blocking apparatus and the interconnecting means serve to provide positive resistance to movement of the floor shift selector locking device out of its latching position under forced movement of the selector member out of its predetermined locked position.

In addition to the use of a mechanically simple flexible cable control interconnecting the separate spaced locking devices in the floor shift and steering column, other features of the invention relate to simplified construction and relationship of parts distinguishing from past automotive coincidental locking arrangements requiring complicated connecting apparatus between these control devices.

These and other features and advantages of the invention will be readily apparent from the following specification and from the drawings wherein.

Figure 1:
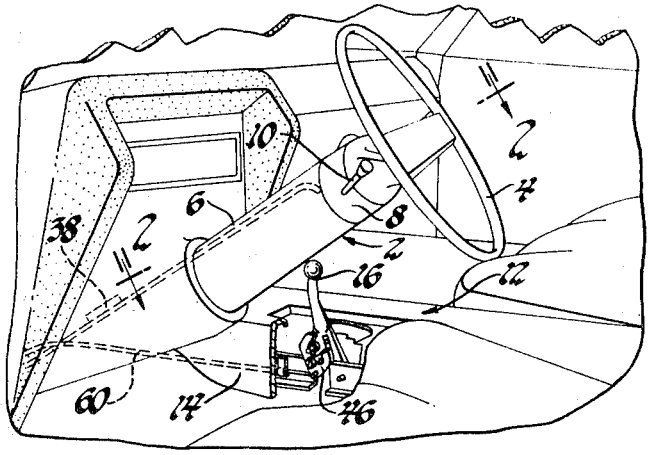
FIG. 1 is a fragmentary perspective view of the interior of an automotive vehicle body including a steering column and a floor shift provided with coincidental locking apparatus according to this invention.

Referring now particularly to FIG. 1 of the drawings, an automotive vehicle body interior is illustrated and includes a generally conventional steering column control apparatus designated generally as 2. The steering column includes a steering wheel 4 which is connected suitably with the usual longitudinally extending steering shaft which serves to connect the steering wheel to the vehicle steering gear in the vehicle engine compartment, not shown. As is known, such steering shaft is conventionally rotatably mounted within the steering column as by lower bearing means fixed within the mast jacket portion 6 thereof and also by bearing means situated within an upper stationary housing portion of die-cast or similar construction, designated 8, mounted atop the mast jacket 6 below the steering wheel. The housing portion also typically supports the usual vehicle turn signal apparatus controlled by a lever 10.

Mounted in spaced relation within the passenger compartment of the vehicle is a floor shift console 12, such console normally comprising a boxlike housing extending longitudinally between the two forward passenger seats within the compartment, the housing being designated 14 and suitably rotatably mounting therewithin a floor shift selector member or lever 16. As is well-known, the lever 16 is conventionally connected by linkage to a control lever on the vehicle power transmission apparatus, not shown, so that rotation of the selector in a longitudinal vertical plane of the vehicle between the several operating positions thereof causes selection of corresponding operating ranges of the transmission. In vehicles produced by the assignee of the present invention as well as by others, such operating ranges for automatic transmissions typically include "Park", "Reverse", "Neutral", "Drive", "Intermediate" and "Low" in sequence from a most forward operating position of the selector member to a most rearward. As the specific construction and connection details attendant to the selector lever 16 are of no consequence with respect to the present invention, they are accordingly not shown nor described.

Figure 2:
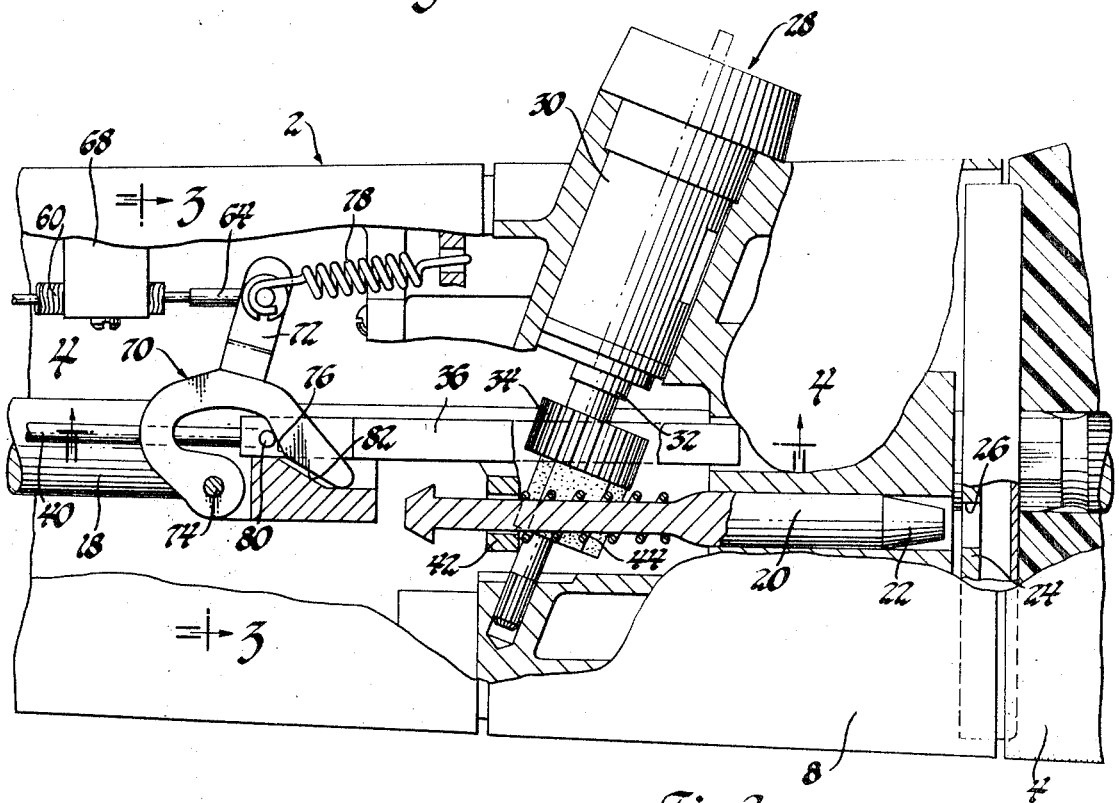
FIG. 2 is an enlarged partially broken away view taken generally along the plane indicated by line 2-2 of FIG. 1.
Figure 3:
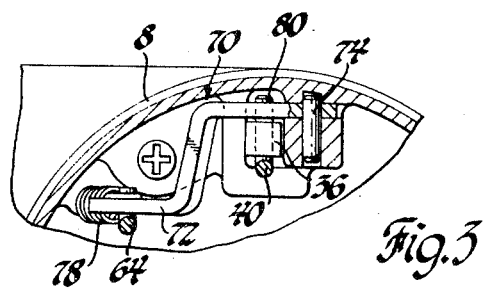
FIG. 3 is a partial sectional view taken generally along the plane indicated by line 3-3 of FIG. 2.

With reference now to the coincidental locking arrangement of the present invention and with specific reference to FIG. 2, stationary housing portion 8 also serves to mount therewithin the steering column portion of the coincidental lock apparatus; i.e., a locking device for steering shaft designated 18. The locking and actuating members of this portion of the invention accord in most respects with that disclosed in U.S. application Ser. No. 691,817 of Wight et al., filed Dec. 19, 1967, now U.S. Pat. No. 3,490,255, dated Jan. 20, 1970, and assigned to the assignee of the present invention. In accordance with that disclosure, the steering shaft designated 18, is adapted to be locked by a shiftable lock bolt 20 slidable in a passage of housing portion 8 between locked and unlocked positions. Lock bolt 20 cooperates with a keeper plate 24 which is suitably nonrotatably connected with the vehicle steering shaft upper portion as by splines. The keeper plate carries a series of peripheral notches 26 adapted each to receive the tapered head 22 of the lock bolt upon movement of the latter from the unlocked to the locked position thereof to effectively prevent rotation of the steering shaft 18 and steering wheel 4 to control the vehicle.

Lock bolt 20 is actuated between its locked and unlocked positions with respect to keeper plate 24 by actuating means including a manually controlled cylinder lock assembly 28 of generally conventional nature including a casing 30 fixed within a bore of stationary housing portion 8 and mounting therewithin for rotation between a plurality of control positions a core, indicated at 32. As is well known, the core 32 is lockable against rotation from a "Lock" position by means of projection of a tumbler-operated sidebar 33 receivable in a slot of casing 30 when a suitably coded key is withdrawn from the tumblers. Insertion of such key withdraws the sidebar from the casing to permit rotation of the core 32 from such locked position to any number of positions operative to establish selection of respective ignition circuits of the vehicle within a switch assembly connected with the core 32, as will be described.

Figure 4:
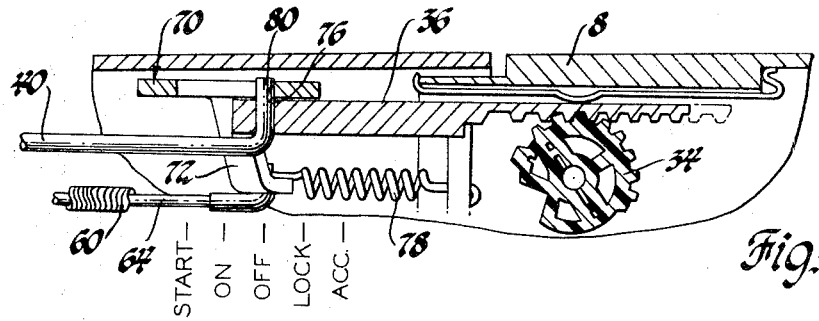
FIG. 4 is a sectional view taken generally along the plane indicated by line 4-4 of FIG. 2.
Figure 6:
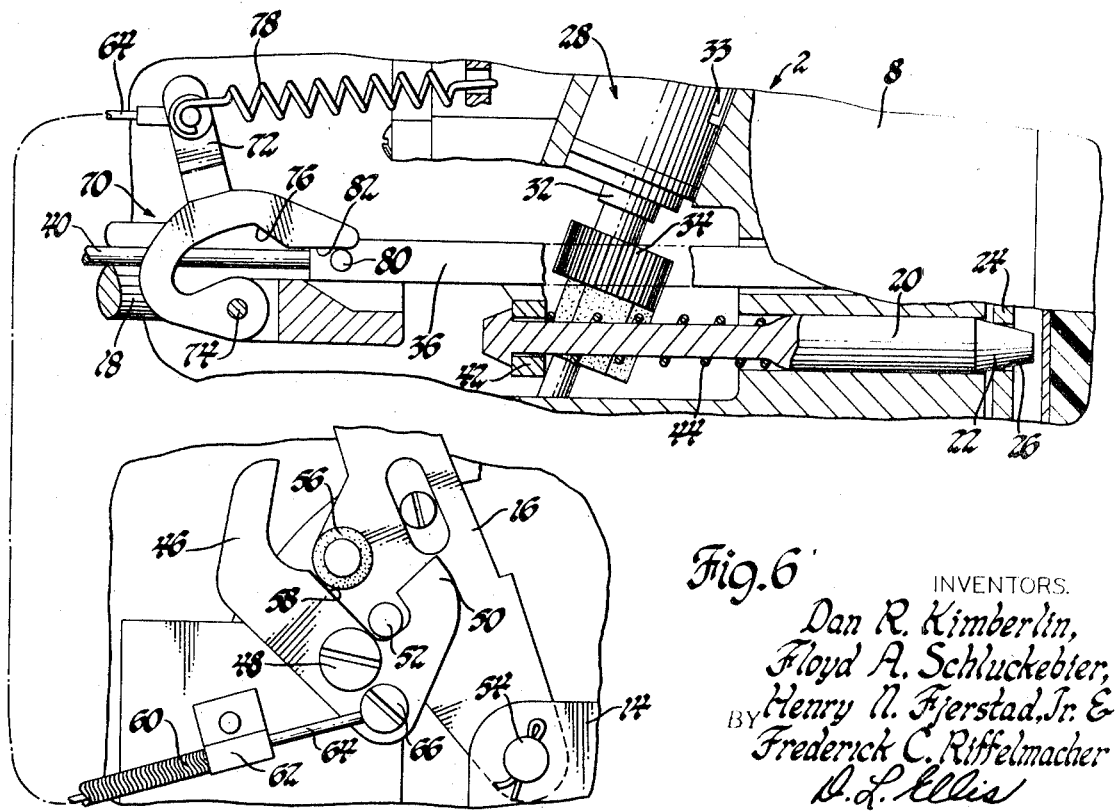
FIG. 6 is a view similar to FIGS. 2 and 5 showing the locking devices of the steering column and the floor shift in locked condition.

Rotation of core 32 is operative through suitable drive connection to rotate an actuating sector 34 meshingly engaged with an actuating rack member 36 likewise reciprocably mounted in a bore or passage of housing portion 8. Core 32 is also operatively connected as above described with an ignition switch assembly 38 mounted upon mast jacket 6, FIG. 1, and electrically connected to the various vehicle ignition, starter motor and other control circuits, such operative connection being established through sector 34 and rack 36 by a shiftable operating rod 40. Accordingly, in the "Lock" position of lock cylinder 28, which is shown in FIG. 6, as well as in an "Off" position of the assembly shown in FIG. 2, rack 36 and operating rod 40 are placed in positions interrupting the vehicle ignition circuit, while selected rotation of core 32 by the key moving these parts leftwardly from the position of FIG. 2 operates to establish various positions in ignition switch assembly 38 closing the ignition circuit either alone or simultaneously with the vehicle starter motor circuit. Such positions are indicated in FIG. 4 with reference to the end of rod 40.

To move lock bolt 20 between its locked and unlocked positions, rack 36 is provided with an ear 42 extending into embracing relation with a reduced diameter portion of the lock bolt and abutted with one headed end thereof, with a coil compression spring 44 being seated between the ear and a shoulder of the bolt. Accordingly, actuating rotation within lock cylinder assembly 28 serves also to move the lock bolt through a variety of positions, specifically between the locked condition of FIG. 6 occurring in the extreme "Lock" position of core 32 shown in FIG. 6, and a series of unlocked positions beginning with that shown in FIG. 2 corresponding to "Off" position of core 32.

Figure 5:
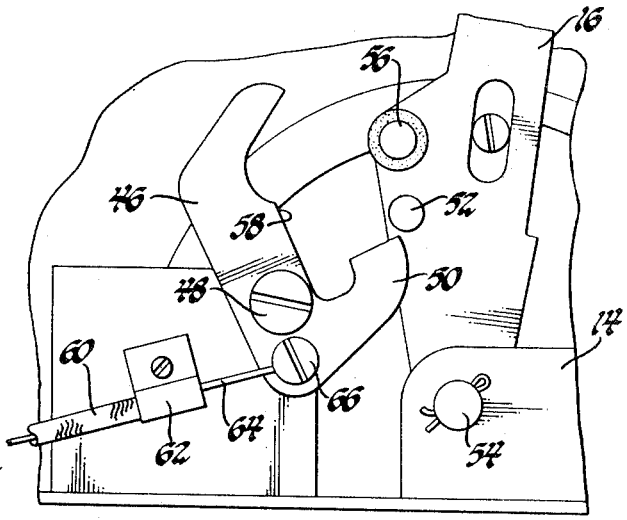
FIG. 5 is an enlarged view of a portion of FIG. 1 showing the floor shift locking device in unlocked condition.

Turning now to the transmission floor shift console structure 12 seen best in FIGS. 1, 5 and 6, the same is provided with a locking device for selector lever 16 including a generally fork-type latch bolt 46 pivotally mounted on housing 14 by a pivot stud 48. The bolt includes a hooked end 50 adapted for retaining engagement with a keeper pin 42 projecting laterally from selector lever 16, such engagement being established in the "Park" position of the lever. Upon movement of the lever about its pivot stud 5 on the console housing from any of the other operative positions toward "Park", a cam roller 56 fixed to the lever engages a follower surface 58 on bolt 46 to rotate it counterclockwise from its unlatched position shown in FIG. 5 to a latched position, shown in FIG. 6, wherein hooked end 50 is latched over keeper 52. As there seen, forced clockwise rotation of selector lever 16 and keeper 52 from the latched position results in forced engagement between the latter and hooked end 50 in a direction passing through pivot stud 48 so that no substantial rotative force about the latter is exerted on the bolt.

Latch bolt 46 is operatively connected with the steering column lock device described above through means of a push-pull control cable assembly 60 having one end portion of the spirally wound sheath thereof attached at 62 to console housing 14, the core 64 of the cable assembly being fixedly secured at 66 to latch bolt 46. Cable assembly 60 is strung through housing 14 and suitably behind the vehicle instrument panel so as to be mounted on mast jacket 6 and extend upwardly for connection to the steering column lock device, all as seen in FIG. 1.

As shown best in FIG. 2, the other end of cable assembly 60 has its sheath portion attached at 68 to stationary housing portion 8 and the core 64 is fixedly secured to an arm 72 of a blocking member 70. Such blocking member is generally of hooklike configuration pivotally mounted at 74 by one leg thereof to the housing portion 8 and including on its other leg a first blocking shoulder 76. A coil tension spring 78 is hooked suitably over the arm 72 of the blocking member and attached at its other end to housing portion 8 to bias the blocking member clockwise to a first or blocking position wherein blocking portion 76 lies within the path of upward movement of a pin projection 80 fixed to rack 36. Pin 80 may be separately formed on the rack, or as seen best in FIG. 4, be an extension of the operating rod 40.

To describe now an operational sequence for the coincidental locking arrangement for the steering column and floor shift console locking devices, it is assumed that the vehicle is being operated with the selector lever 16 located in some forward or reverse drive range, and with the lock cylinder assembly 28 conditioned in the "On" position indicated in FIG. 4. In these conditions, the selector lever is unlatched as indicated generally in FIG. 5, the lock bolt 20 is in an unlocked position and the blocking member 70 is in its first blocking position, all as indicated in FIG. 2, under the bias of spring 78 and such bias transfers through core 64 of the cable assembly to hold floor shift latch bolt 46 in the unlatched position. The pin 80 on rack 36 is of course located slightly leftwardly of the position shown in FIG. 2, with rack 36 so located in "On".

When the operator desires to stop the vehicle and place the controls thereof in an inoperative and locked condition, rotation in the lock cylinder assembly 28 in a direction toward "Lock" position moves the rack 36 rightwardly first to the "Off" position shown in FIG. 2. The ignition switch 38 thereby interrupts the ignition circuit to stop the vehicle engine and simultaneously pin 80 is brought into blocking engagement with shoulder 76. This blocking shoulder is so arranged that further forced rotation by the operator in lock cylinder assembly 28 tending to move the rack 36 rightwardly full to "Lock" is positively prevented by the engagement between the pin and such shoulder. Such further rotation may only be accomplished by removing blocking member 70 counterclockwise by the preliminary step of moving floor shift selector lever 16 to the predetermined transmission condition of "Park". Thus, counterclockwise movement of selector lever 16 from the driving position of FIG. 6 engaging cam roller 56 with surface 58 of the floor shift latch bolt 46 moves the latter counterclockwise to its latched condition. This in turn shifts or pulls core 64 of the control cable assembly 60 in a direction moving the blocking member 70 counterclockwise against the action of spring 78 to its unblocking position, shown in FIG. 6. Accordingly, with shoulder 76 removed, lock cylinder assembly 28 may then be further rotated to the "Lock" position shown in FIG. 6 and the coded key removed therefrom to extend the locking sidebar 33 and establish locking in all of the components of the coincidental lock assembly.

In this locked position, it is seen that rack 36 is so located as to juxtapose pin 80 thereof against a further blocking shoulder 82 of blocking member 70. This juxtaposition effectively prevents forced movement of floor shift selector lever 16 from its selected "Park" condition since return of the latch bolt 46 to unlatched position under the tension of extended spring 78 is prevented by engagement of shoulder 82 on the pin. Also, while forced rotation of the bolt 46 by selector 16 is primarily resisted by the application of such force directly through pivot 48 as indicated in the drawing, pin 80 resists any pushing of core 64 which may for some reason result form such forces. Thus, any forced clockwise rotation of the lever from the position of FIG. 6 tending to force latch bolt 46 clockwise seeks to push core 64 in a direction to in turn firmly engage the blocking member 70 against pin 80. This is especially effective were the flexible cable to be replaced by a more solid connecting linkage subject to direct transfer of a pushing motion. Accordingly, in the position of the parts shown in FIG. 6, not only is the lock cylinder control for the ignition switch 38 fully locked as well as the steering shaft lock bolt 20 suitably engaged in or engageable with a notch 26 of keeper plate 24, but additionally selector lever 16 is positively locked in "Park."

To unlock the coincidental lock arrangement for normal operation of the vehicle, insertion of the coded key in lock cylinder assembly 28 and subsequent rotation of core 32 from the "Lock" position of FIG. 6, shifts the rack 36 leftwardly initially to the "Off" position of FIG. 2 removing pin 80 from shoulder 82 and removing lock bolt 20 to a withdrawn position from keeper plate 24. The vehicle operating circuits are thus ready for connection in ignition switch 38 by further key rotation of the lock cylinder and leftward shifting of operating rod 40, and floor shift console 12 may be selectively removed from its latched condition. Clockwise rotation of the selector lever 16 from "Park" removes cam 56 from surface 58 of the latch bolt 46 thereby allowing tension spring 78 to return blocking member 70 to its blocking position shown in FIG. 2, such motion transferring through core 64 to return the latch bolt to its unlatched position, FIG. 5. Hooked end 50 is thus removed from interference with keeper 52 and the selector lever 16 may be moved to any operative position of the transmission such as that indicated in FIG. 5. With the parts in this position, the blocking member 70 is again in position as above-described such that coincidental locking of the steering column and floor shift locking devices cannot occur until selector lever 16 is again first placed in "Park".

It is to be understood that the coincidental locking arrangement described above in connection with floor shifts for automatic transmissions applies equally well to those for manual gear shift transmissions. In such case, the select lever 16 and latch bolt 46 may be arranged for latching engagement in a nonforward drive range such as "Neutral" or "Reverse".

It will further be appreciated that certain modifications of the illustrated preferred embodiment may be made within the general intent thereof such as instead of directly connecting blocking member 70 through the control cable assembly to latch bolt 46, an intermediate actuating lever may be so mounted within console 12 that it responds directly to movement of the sector lever between its positions to move the core 64 and also to actuate the latch bolt 46 between its positions. Likewise, various forms of blocking shoulder arrangements on rack 36 and blocking member 70 are available for use.

Having thus described the invention, what we claimed is:

1. In an automotive vehicle including steering column apparatus provided with a steering shaft and further including a transmission shift apparatus mounted on the floor of the vehicle passenger compartment in spaced relation to said steering column, said shift apparatus including a support housing on the floor and a selector member therein operably connected to the vehicle power transmission and movable to select different operating ranges thereof, steering column and floor shift locking apparatus comprising a keeper on said steering shaft, a lock bolt mounted in said steering column for movement between locked and unlocked positions relative to said keeper, lockable manual actuating means mounted on said steering column and operably connected with said bolt for causing movement thereof between locked and unlocked positions, cooperable latch means on said selector member of said shift apparatus and said housing thereof, said latch means being movable between a latched position occurring in a predetermined position of said selector corresponding to a nonforward drive range of the vehicle power transmission to hold said selector therein and an unlatched position, lock-blocking means mounted in said steering column for movement between a blocking position preventing movement of said bolt from the unlocked to the locked position thereof by said manual actuating means and an unblocking position, means connecting said blocking means to said selector member so that movement of the latter to said predetermined position thereof causing latching of said cooperable latch means moves said blocking means from the blocking to the unblocking position thereof permitting subsequent movement of said lock bolt from the unlocked to the locked position thereof by said manual actuating means, and means operative in response to such movement of said lock bolt to the locked position thereof to hold said latch means in the latched position thereof.

2. In an automotive vehicle including steering column apparatus provided with a steering shaft and further including a transmission shift apparatus mounted on the floor of the vehicle passenger compartment spaced relation with said steering column, said shift apparatus including a support housing on the floor and a selector member therein operably connected to the vehicle transmission and movable to select different operating ranges thereof, steering column and floor shift locking apparatus comprising a keeper on said steering shaft, a lock bolt mounted in said steering column for movement between locked and unlocked positions relative to said keeper, lockable manual actuating means mounted on said steering column and operably connected with said bolt for causing movement thereof between locked and unlocked positions, cooperable latch means on said selector member of said shift apparatus and said housing thereof movable between a normal unlatched position and a latched position, means on said latch means and on said selector member operative to move the former to the latched position thereof in response to movement of said selector member to a predetermined position thereof corresponding to a nonforward drive range of the vehicle power transmission to hold said selector member therein, lock-blocking means mounted in said steering column for movement between a blocking position preventing movement of said bolt from the unlocked to the locked position thereof by said manual actuating means and an unblocking position, means operatively connecting said blocking means to said latch means so that movement of the latter to the latched position thereof in response to movement of said selector member to said predetermined position thereof induces movement of said blocking means from the blocking to the unblocking position thereof permitting subsequent movement of said lock bolt from the unlocked to the locked position thereof by said manual actuating means, and means operative in response to such movement of said lock bolt to the locked position thereof to hold said latch means in the latched position thereof.

3. In an automotive vehicle including steering column apparatus provided with a steering shaft and further including a transmission selector apparatus mounted on the floor of the vehicle passenger compartment in spaced relation with said steering column, said selector apparatus including a support housing on the floor and a selector member therein operably connected to the vehicle transmission and movable to select different operating ranges thereof, steering column and floor shift locking apparatus comprising a keeper on said steering shaft, a lock bolt mounted in said steering column for movement between locked and unlocked positions relative to said keeper, lockable manual actuating means mounted on said steering column and operably connected with said bolt for causing movement thereof between locked and unlocked positions, cooperable latch means on said selector member of said shift apparatus and said housing thereof movable between a normal unlatched position and a latched position, means on said latch means and on said selector member operative to move the former to the latched position thereof in response to movement of said selector member to a predetermined position thereof corresponding to a nonforward drive range of the vehicle power transmission to hold said selector member therein, lock-blocking means mounted in said steering column for movement between a blocking position preventing movement of said bolt from the unlocked to the locked position thereof by said manual actuating means and an unblocking position, means operatively connecting said blocking means to said latch means so that movement of the latter to the latched position thereof in response to movement of said selector member to said predetermined position thereof induces movement of said blocking means from the blocking to the unblocking position thereof permitting subsequent movement of said lock bolt from the unlocked to the locked position thereof by said manual actuating means, means biasing said blocking means to the blocking position thereof, said operative connecting means being effective to transfer said bias on said blocking means to said latch means to bias the latter to the unlatched position thereof, and cooperating means on said actuating means and said blocking means operative in the locked position of said lock bolt to hold said blocking means in the unblocking position thereof and thereby effective through said operative connecting means to hold said latch means in the latched position thereof.

4. In an automotive vehicle including steering column apparatus provided with a stationary portion rotatably mounted therewithin a steering shaft, and further including a transmission floor shift apparatus mounted on the floor of the vehicle passenger compartment in spaced relation with said steering column, said floor shift apparatus including a support housing on the floor and a selector member therein operably connected to the vehicle power transmission and movable to select different operating ranges thereof, steering column and floor shift locking apparatus comprising a keeper member mounted on said steering shaft, a lock bolt mounted slidably in said steering column stationary portion for movement between locked and unlocked positions relative to said keeper member, lockable manual actuating means including a key controlled cylinder lock and sector device and a rack member connected to said lock bolt and reciprocable within said stationary portion by rotation of said key-controlled cylinder lock and sector device, ignition switch means connected with the vehicle electrical ignition circuit and mounted on said steering column, means connecting said actuating rack member with said ignition switch means, a fork latch bolt rotatably mounted on said floor shift housing, a striker fixed to said selector member, cam means on said selector member engageable with said fork bolt upon movement of said selector member to a predetermined position thereof corresponding to a nonforward driving range of the vehicle power transmission to move said fork bolt from a normal unlatched position thereof to a latched position in engagement with said keeper, a blocking member rotatably mounted in said steering column stationary portion for movement between a blocking and an unblocking position, shoulder means on said blocking member and on said actuating rack member engageable in the blocking position of said blocking member to prevent movement of said actuating rack from the unlocked to the locked position of said lock bolt, spring means mounted between said stationary portion of said steering column and said blocking member urging the latter to said blocking position thereof, flexible cable means connecting said blocking member with said fork bolt to transfer the bias on said blocking member in a manner to bias said fork bolt to the unlatched position thereof, said movement of said selector member to said predetermined position thereof being operative to transfer motion of said fork bolt to the latched position thereof through said connecting means to move said blocking member from the blocking to the unblocking position thereof against the action of said biasing means, and further shoulder means on said blocking member and said actuating rack operative in the unblocking position of said blocking member and the locked position of said rack to prevent forced movement of said blocking member and said connecting means and said fork bolt as a unit out of the latched position of said fork bolt.